UNITED STATES PATENT OFFICE.

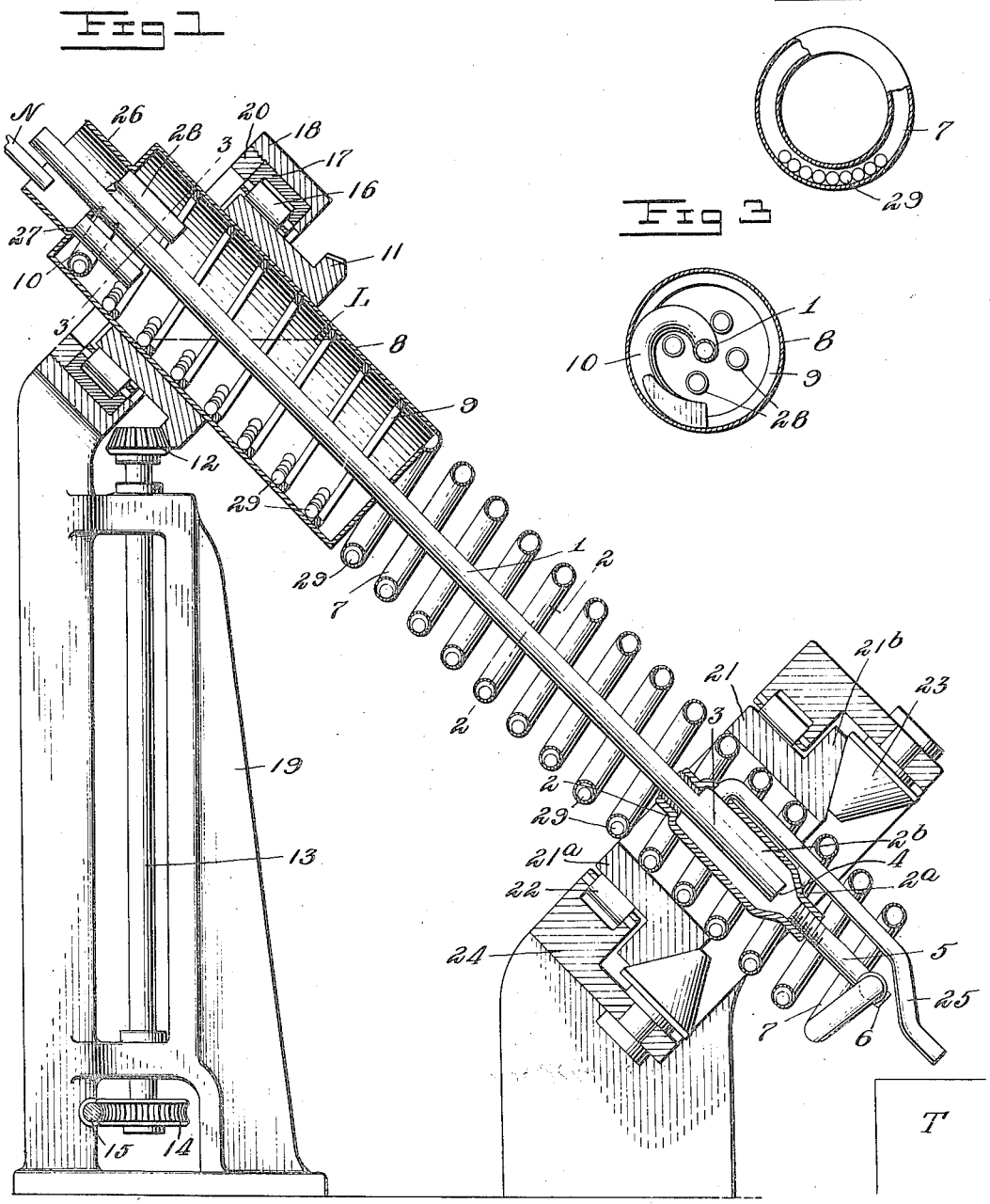

HARRY R. CONKLIN, OF JOPLIN, MISSOURI.

PRECIPITATION.

1,160,849.  Specification of Letters Patent.  Patented Nov. 16, 1915.

Application filed April 7, 1915. Serial No. 19,823.

*To all whom it may concern:*

Be it known that I, HARRY R. CONKLIN, a citizen of the United States of America, residing at Joplin, in the county of Jasper and State of Missouri, have invented certain new and useful Improvements in Precipitation; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to the precipitation of substances from their solutions by means of solid precipitants, types of which are represented by; copper by means of iron, gold and silver by means of zinc or aluminum, or both; it of course being understood that appropriate solutions are used.

I am aware that it has been heretofore proposed to pass a cyanid solution containing gold and silver through a tube mill containing zinc balls or zinc balls in connection with a zinc lining, or to pass such a solution successively through a series of boxes or tanks containing zinc shavings and that it has also been proposed to supply finely comminuted zinc to the solutions which is carried along with the solution to settling tanks or filter presses where the precipitate is separated. There is great objection from a practical standpoint to the use of a tube mill for the reason that there is a great deal of attrition, whereby particles of zinc are ground off and flow with the solution and precipitate, in suspension, to the filters, the precipitate containing considerable zinc and zinc oxid which requires removal to obtain good bullion. The same objection applies to zinc shavings, the smaller particles of the shavings resulting from the continuous dissolving action of the solution, fall into the precipitate sludge and remain undissolved so that the sludge will have to be subjected to some treatment for the removal of zinc. In using zinc dust there is considerable accumulation of zinc oxid as well as metal in the precipitate so that the removal of zinc again comes into question.

I have succeeded in eliminating metallic precipitant or its oxid, especially zinc or zinc oxid from the precipitate by causing the precipitant or pieces of the precipitant of considerable size to move in succession through the solution to be precipitated. I thus simplify present practice considerably, because no zinc metal is mixed with the precipitate and no special precautions have to be taken to exclude air from the precipitate solution after precipitation. I proceed preferably by using the precipitant in the form of solid round pieces or substantially such as cylinders or balls, and roll them through the solution, preferably through a counter current of the solution; these cylinders or balls preferably traveling in a closed circuit. The advantage of this is that there is little or no attrition or mechanical action on the moving pieces of precipitant to produce fines that may be entrained with the precipitate in the solution; and they are self clearing of the precipitate; the precipitate being removed preferably, but not necessarily from the field of action of the pieces of precipitant at or near the beginning of the advance portion of the circuit in which these pieces move. I prefer, however, to remove the precipitate from the path of movement of the pieces of precipitant by means of the flow of the solution. Another advantage is that when these pieces become so small that they cannot well be circulated in their circuit, they collect at the head or beginning of the current or flow of solution where the chemical action is most energetic and become dissolved, any precipitate formed by them being entrained by the current to the point of discharge of the solution. The precipitate can be separated from the spent solution in any well known manner.

A suitable apparatus for carrying out the process above described is shown in the accompanying drawings in which like parts are similarly designated and in which:

Figure 1 is a vertical longitudinal section, parts thereof being shown in elevation. Fig. 2 is a section on line 2—2 of Fig. 1. Fig. 3 is a section on line 3—3 of Fig. 1.

The apparatus shown is rotatable and is preferably mounted in an inclined position to facilitate the flow of solution through it, and is provided with suitable rotating means.

I provide a central longitudinal pipe 1 whose lower end is screwed into or otherwise connected to a casting 2 that is provided with a central tube 3 in alinement with and forming an extension of the pipe 1. This tube is preferably integral with the tube 1 as shown. This tube is provided with a suitable liquid outlet 4. The lower end of the portion 3 extends nearly to the reduced tubular end $2^a$ of the casting or discharge chamber 2 into the lower end of which is fastened a short pipe 5 closed by a removable plug 6. The pipe 1, tube 3, reduced portion $2^a$ of the casting 2, and pipe 5, form a straight continuous passage or duct for the solid precipitant that connects at its lower end, namely at the end of the short pipe section 5, with a worm or pipe spiral 7 surrounding the aforesaid straight pipe and preferably concentric with it. This spiral 7 communicates at its upper end with an inlet chamber 8, which surrounds the upper portion of pipe 1 and has an internal continuous rib 9 forming a continuation of the pipe spiral, preferably of the same pitch. The spiral rib terminates at the upper end of the inlet chamber 8 in a short spiral pipe 10 connecting with the pipe 1.

The inlet chamber 8 which is preferably cylindrical, has secured thereto a bevel wheel 11, driven by a bevel pinion 12 on a vertical shaft 13. The shaft 13 has a worm wheel 14 driven by worm 15 actuated from any suitable source of power. The hub of the bevel wheel 11 rests on rollers 16 mounted in a bearing member 17 seated in a frame member 18 forming a portion of the casting or pedestal 19. The rollers and their bearing member 17 are locked in position in the frame member 18 by a ring 20.

The lower end of the worm pipe 7 is provided with a casting 21 having a cylindrical bearing $21^a$ movable on rollers 22, and a thrust bearing $21^b$ supported on rollers 23. The rollers 22 and 23 are mounted in a suitable support 24.

The casting 2 is provided with a chamber $2^b$ surrounding the tube 3. From the upper end of the chamber 2 extends a discharge pipe 25. In use, this pipe will discharge into any suitable receptacle as a tank T.

The upper end of the inlet chamber 8 is preferably but not necessarily, reduced in cross section as at 26 which preferably has a closed bottom 27 provided with pipes 28 for carrying the solution beyond the spiral pipe 10 into the chamber 8. The spiral or worm pipe 7 and chamber 8 are provided with a solid precipitant in the form of pieces or balls 29.

The operation is as follows: Pieces of solid precipitant, preferably, but not necessarily zinc or aluminum balls 29 are introduced into the upper end of the pipe 1, which pass through the entire central conduit or pipe 1 into the lower turn of the worm pipe 7. Upon slowly rotating the machine in the proper direction, the balls 29 travel to the upper end of the spiral pipe 7 and discharge onto the continuing spiral rib 9. The supply of balls is continued until balls begin to feed through the short spiral pipe 10 back into the pipe 1 again. Solution to be precipitated is then supplied continuously through a pipe indicated at N to the portion 26, passes through the short pipes 28, which prevent the solution from following the balls into the pipe 10, into the chamber 8, spiral 7, short section of pipe 5, slots 1 or openings 4, chamber $2^b$ of casting 2 and discharge pipe 25 to the tank T. The balls or pieces of precipitant 29 travel counter to the solution over a very long path. When the balls have been dissolved to such an extent by the solution that they will not travel or transfer into the pipe 10 they remain in the chamber 8 and there the most intense dissolving action takes place, due to the action of fresh solution. When the pieces become so small that they cannot overcome the flow of the solution and are compelled to travel with it, they then pass with the solution into the spiral pipe and are caught by the advancing balls therein and become dissolved. Thus it will be seen that the pieces of precipitant are advanced without any grinding action on them; that the small pieces and fines are all advanced to the upper inlet end of the machine, and small particles are trapped by the advancing balls so that no zinc will enter the precipitate and the precipitate will be continuously discharged with the solution through pipe 25. Each spiral thus forms a sort of trap for floating pieces of zinc, which are constrained to remain at the lower portion of the spiral or turn of pipe 7, by the zinc balls advancing counter to the flow.

I claim—

1. The method of precipitating substances from solutions which comprises passing a solution of the substance successively over pieces of a suitable solid precipitant moving in succession.

2. The method of precipitating substances from solutions which comprises subjecting a solution of the substance to pieces of appreciable volume of a suitable solid precipitant moving in succession in a direction opposite to said solution.

3. The method of precipitating substances from solutions which comprises subjecting a solution of the substance to the action of pieces of a suitable solid precipitant in succession while maintaining relative motion in opposite directions between the solution and precipitant and while subjecting the precipitant to friction.

4. The method of precipitating substances from solutions which comprises moving successive pieces of a solid precipitant counter to the current of a solution of said substances, and removing the precipitate as it is formed by the flow of the solution.

5. The method of precipitating substances from solutions, which comprises causing pieces of a solid precipitant to move in succession through a closed circuit and causing a solution containing a substance capable of being precipitated thereby to contact therewith in a portion of said circuit.

6. The method of precipitating substances from solutions, which comprises causing pieces of a solid precipitant to move in a closed circuit and causing a solution containing a substance capable of being precipitated thereby to move in a contacting counter current.

7. The method of precipitating substances from solutions, which comprises causing pieces of a solid precipitant to move in succession through a closed circuit and causing a solution containing a substance capable of being precipitated thereby to contact therewith in a portion of said circuit, removing the precipitate as it is formed from the precipitant.

8. The method of precipitating substances from solutions, which comprises causing pieces of a solid precipitant to move in a closed circuit and causing a solution containing a substance capable of being precipitated thereby to move in a contacting counter current, and removing the precipitate from the precipitant by the flow of the solution.

9. The method of precipitating substances from solutions, which comprises rolling a series of round solid pieces of a precipitant, through a counter current of a solution of a substance capable of being precipitated thereby.

10. The method of precipitating substances from solutions, which comprises rolling a series of round solid pieces of a precipitant in succession in a closed circuit through a current of a solution of a substance capable of being precipitated thereby and flowing counter to a portion of said circuit.

11. The method of precipitating substances from their solutions by solid precipitants, which comprises passing a succession of upwardly moving pieces of solid precipitant in contact with the downwardly flowing solution from which said substances are to be precipitated.

12. The method of precipitating solutions, which comprises causing the solution to flow in an alternating upwardly and downwardly directed path, and causing a solid precipitant to move counter to the direction of movement of the solution and in contact therewith.

13. The method of precipitating solutions, which comprises causing a continuous flow of solution in an alternating upwardly and downwardly directed path, and causing a continuous movement of a solid precipitant counter to the direction of movement of the solution and in contact therewith.

14. The method of precipitating solutions, which comprises causing a solution to flow in an alternating upwardly and downwardly directed path having a general downward direction, and causing the movement of a solid precipitant in a contacting counter direction.

15. The method of precipitating solutions, which comprises causing a solution to flow in an alternating upwardly and downwardly directed path, causing a bodily movement of the solution in a direction opposite to its direction of flow but at a slower rate than its rate of flow, and causing a solid precipitant to be moved counter to the direction of flow of the solution.

In testimony that I claim the foregoing as my invention, I have signed my name.

HARRY R. CONKLIN.